United States Patent
Fukuzawa et al.

[11] Patent Number: 5,926,744
[45] Date of Patent: Jul. 20, 1999

[54] RECEIVING APPARATUS, RECEIVING METHOD, AND TERMINAL UNIT

[75] Inventors: Keiji Fukuzawa, Chiba; Kozo Kobayashi, Kanagawa; Hiroyuki Mita; Mitsuru Ikeda, both of Saitama, all of Japan

[73] Assignee: Sony Corporation, Tokyo, Japan

[21] Appl. No.: 08/760,408

[22] Filed: Dec. 4, 1996

[30] Foreign Application Priority Data

Dec. 25, 1995 [JP] Japan ..................................... 7-336375

[51] Int. Cl.⁶ ....................................................... H04N 7/16
[52] U.S. Cl. ........................... 455/3.2; 455/6.2; 348/8; 348/10
[58] Field of Search .............................. 455/3.1, 3.2, 4.1, 455/6.1, 6.2, 5.1, 6.3; 348/7, 12, 13, 10, 8, 6, 725; H04N 7/20, 7/16, 7/10, 7/173

[56] References Cited

U.S. PATENT DOCUMENTS

| | | | |
|---|---|---|---|
| 4,802,239 | 1/1989 | Ooto | 455/277 |
| 5,276,904 | 1/1994 | Mutzig et al. | 455/3.2 |
| 5,774,194 | 6/1998 | Armbruster | 455/3.2 |
| 5,787,335 | 7/1998 | Novak | 348/8 |
| 5,805,975 | 9/1998 | Green, Sr. et al. | 455/3.2 |

Primary Examiner—Chris Grant
Attorney, Agent, or Firm—Jay H. Maioli

[57] ABSTRACT

A receiving apparatus, a receiving method, and a terminal unit. The receiving apparatus including a receiving portion for receiving a number of multiplexed broadcast waves, a separation portion for separating the number of multiplexed broadcast waves received by the receiving portion into a number of types of broadcast waves, a conversion portion for converting the number of types of broadcast waves separated by the separation portion into a number of IF signals of mutually different frequencies; and an output portion for outputting the number of IF signals converted by the conversion portion to a processing section.

20 Claims, 9 Drawing Sheets

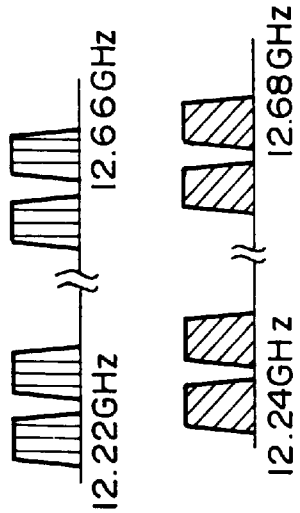
FIG.3(A) MULTIPLEXED RADIO WAVE
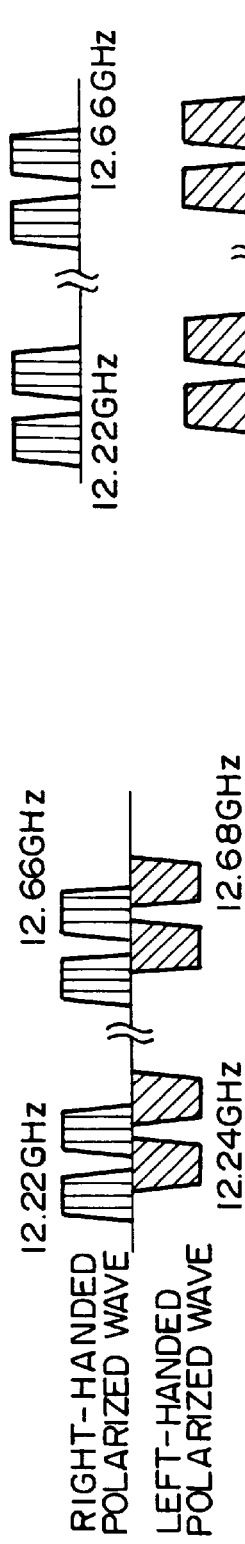
FIG.3(B) RIGHT-HANDED POLARIZED WAVE COMPONENTS
FIG.3(C) LEFT-HANDED POLARIZED WAVE COMPONENTS
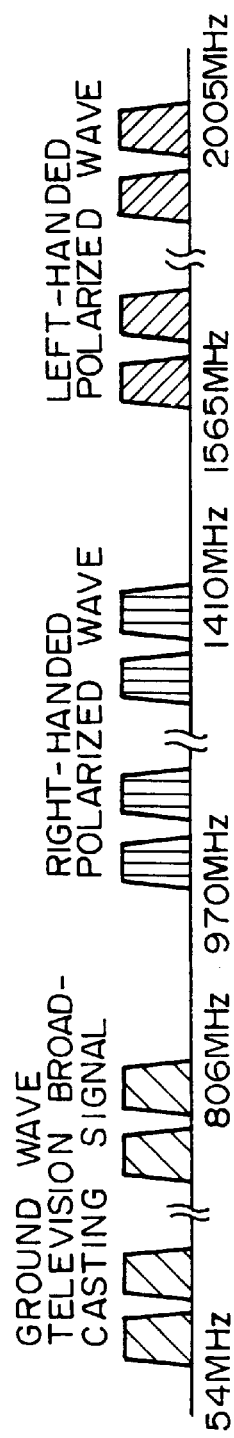
FIG.3(D) IF SIGNAL

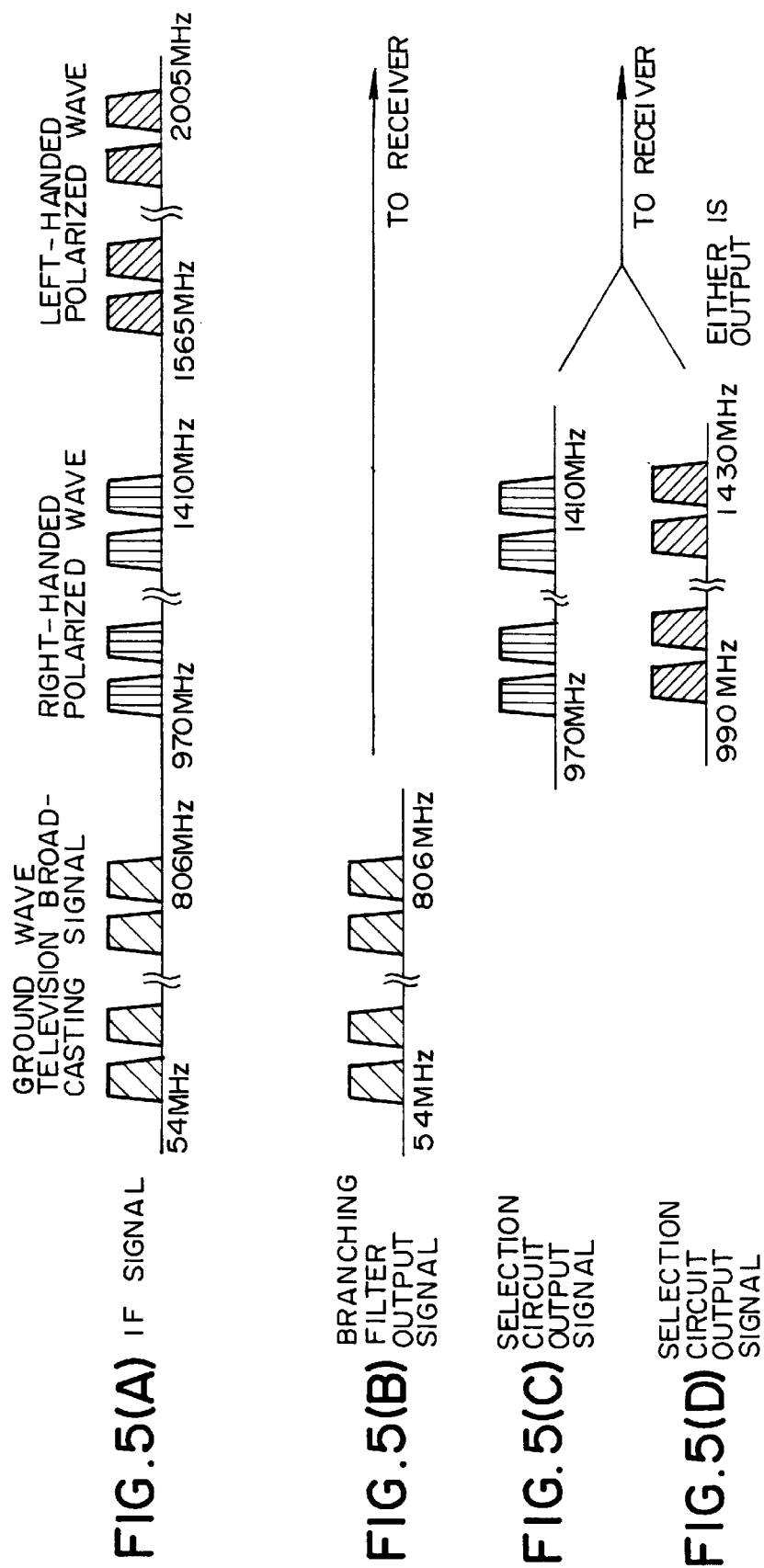

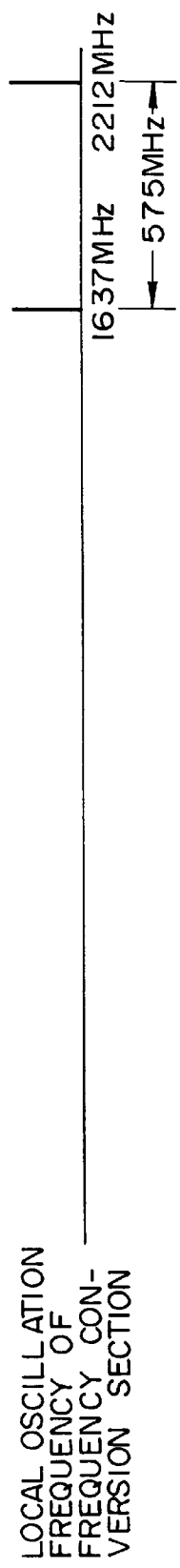
FIG. 6(A) LOCAL OSCILLATION FREQUENCY OF FREQUENCY CONVERSION SECTION
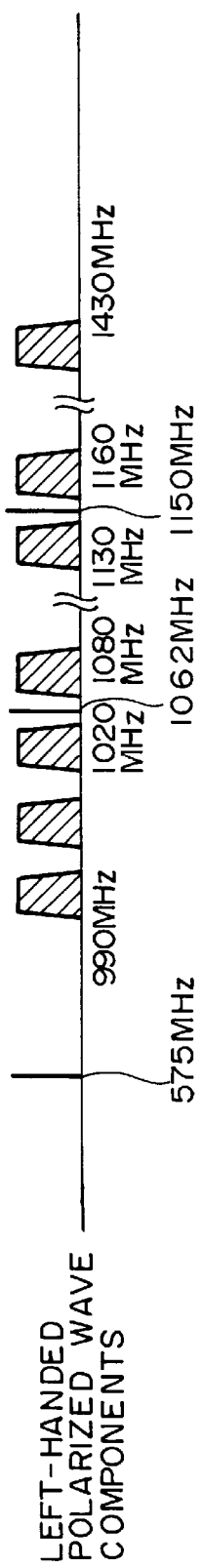
FIG. 6(B) LEFT-HANDED POLARIZED WAVE COMPONENTS continued …

RECEIVING APPARATUS, RECEIVING METHOD, AND TERMINAL UNIT

FIELD OF THE INVENTION

The present invention relates to a receiving apparatus, a receiving method, and a terminal unit. More particularly, the present invention relates to a receiving apparatus for receiving multiplexed broadcast waves and distributing them to a number of terminal units, a receiving method therefor, and a terminal unit.

BACKGROUND OF THE INVENTION

In order to further increase the amount of information in broadcast waves transmitted via a broadcast satellite, there is, for example, a method of multiplexing left-handed and right-handed polarized waves, or vertically and horizontally polarized waves.

In order to receive polarized waves transmitted by this method, hitherto, a separation apparatus for separating multiplexed broadcast waves into left-handed polarized waves and right-handed polarized waves must be added to a conventional receiving apparatus (apparatus for receiving radio waves which are not multiplexed).

In particular, in a community receiving system (consisting of a community receiving apparatus and a terminal for each viewer) in a multi-family housing area or the like, the number of terminal units to which the received broadcast waves are distributed is great and many separation apparatuses must be added in order to receive the above-mentioned multiplexed broadcast waves.

Accordingly, various schemes are employed so as to receive multiplexed broadcast waves by adding a minimum number of separation apparatus to a conventional community receiving system.

FIG. 8 is a block diagram illustrating an example of the arrangement of a community receiving system. In FIG. 8, a parabolic antenna 11 is designed to receive radio waves in the RF (Radio Frequency) band, which are multiplexed by right-handed polarized waves and left-handed polarized waves (or vertically polarized waves and horizontally polarized waves) transmitted from a broadcast satellite (not shown). A low noise block (LNB) converter 12 is designed to separate the radio waves in the RF band received by the parabolic antenna 11 into left-handed polarized waves and right-handed polarized waves, convert the waves to signals in the IF (Intermediate Frequency) band (hereinafter referred to as "IF signals"), and feed them to distributors 13a and 13b.

The distributors 13a and 13b distribute the IF signals of the left-handed polarized waves and the IF signals of the right-handed polarized waves to multi-switches 14a and 14b, respectively. The multi-switches 14a and 14b select either the IF signals of the left-handed polarized waves or the IF signals of the right-handed polarized waves in accordance with an individual polarized wave switching signal fed from each terminal unit (consisting of a receiver 15a through 15d and a television receiver 16a through 16d) of each subscriber and supplies the IF signals to each terminal unit.

The receivers 15a to 15d output a polarized wave switching signal to multi-switches 14a and 14b on the basis of the operation by the viewer, input the IF signals of the left-handed polarized waves or the IF signals of the right-handed polarized waves which are selected in accordance with the polarized wave switching signal and performs a process for converting the signals to the RF signals of a still lower frequency, and finally feed the signals to the television receivers 16a to 16d. The television receivers 16a to 16d extract video and sound signals from the signals fed from the receivers 15a to 15d and output these signals to make a display.

The operation of the above-described prior art will be described in greater detail below.

The multiplexed broadcast waves transmitted from a broadcast satellite (not shown) are received by the parabolic antenna 11. The LNB converter 12 separates the received broadcast waves into radio waves of left-handed and right-handed polarized waves and converts them into IF signals, and finally feeds the IF signals to the distributors 13a and 13b, respectively. The distributors 13a and 13b distribute the IF signals of the left-handed polarized waves and the IF signals of the right-handed polarized waves to the multi-switches 14a and 14b, respectively.

The multi-switches 14a and 14b select either one type of the IF signals of the left-handed polarized waves or the IF signals of the right-handed polarized waves in accordance with a polarized wave switching signal fed from the receivers 15a to 15d and feed the IF signals to the receivers 15a to 15d.

With the above-described arrangement, each viewer specifies either one type of the left-handed polarized waves or the right-handed polarized waves by a predetermined operation. Thereupon, the multi-switches 14a or 14b automatically selects either one type of these signals, making it possible to view a desired broadcast (program).

FIG. 9 is a block diagram illustrating another example of an arrangement of a community receiving system. Those components in FIG. 9 which are the same as those in FIG. 8 are given the same reference numerals and, therefore, a description thereof is omitted.

Receivers 21a to 21d receive the IF signals of the left-handed and right-handed polarized waves fed from the distributors 13a and 13b through separate signal cables and select these signals by a built-in switch (not shown). Then, a process for converting the selected IF signals into RF signals of a still lower frequency is performed, after which the RF signals are output to the television receivers 16a to 16d.

Other points of this arrangement are the same as those in FIG. 8.

The operation of the example shown in FIG. 9 will be described in greater detail below.

The parabolic antenna 11 receives radio waves in the RF band transmitted from a broadcast satellite (not shown). The LNB converter 12 separates the received radio waves into the radio waves of the left-handed and right-handed polarized waves and converts the radio waves into the IF signals, and then feeds the IF signals to distributors 13a and 13b, respectively.

The distributors 13a and 13b distribute and feed the input IF signals corresponding to the left-handed and right-handed polarized waves to each of the receivers 21a to 21d through separate cables. The receivers 21a to 21d select either one type of the IF signals corresponding to the left-handed or right-handed polarized waves fed from distributors 13a or 13b, perform a process for converting the IF signals into RF signals of a still lower frequency, and then output the RF signals to the television receivers 16a to 16d.

With the above-described arrangement, each viewer may operate the receivers 21a to 21d in order to select and view desired programs contained in either the left-handed polarized waves or the right-handed polarized waves.

In the example shown in FIG. 8, two cables are required to transmit the IF signals of the right-handed and left-handed polarized waves from outdoors to indoors. There are problems in that since the number of distributions of the multi-switches 14a and 14b is limited to some extent, the multi-switches cannot be used in large-scale community receiving facilities. Further, multi-switches 14a and 14b are normally expensive, causing the cost of facilities to increase.

In the example shown in FIG. 9, there are problems in that since two cables for supplying the IF signals from the distributors 13a and 13b to each receiver are required for each terminal unit, a large quantity of cable must be newly laid, resulting in increased costs.

SUMMARY OF THE INVENTION

The present invention has been achieved in view of the above-described circumstances. An object of the present invention is to make it possible to receive multiplexed satellite broadcast by simple facilities.

To achieve the above-described object, according to a first aspect of the present invention, there is provided a receiving apparatus, comprising: receiving means for receiving multiplexed broadcast waves; separation means for separating the multiplexed broadcast waves received by the receiving means into a plurality of types of broadcast waves; conversion means for converting the plurality of types of broadcast waves separated by separation means into IF signals of mutually different frequencies; and output means for outputting the IF signals converted by the conversion means to a processing section.

According to a second aspect of the present invention, there is provided a receiving method, comprising the steps of: receiving multiplexed broadcast waves; separating the received multiplexed broadcast waves into a plurality of types of broadcast waves; and converting the plurality of types of separated broadcast waves into IF signals of mutually different frequencies.

According to a third aspect of the present invention, there is provided a receiving apparatus, comprising: first receiving means for receiving a satellite broadcast; second receiving means for receiving one type of a cable television broadcast or a ground wave television broadcast; and conversion means for converting the satellite broadcasting signals, the cable television broadcasting signals or the ground wave television broadcasting signals, received by the first receiving means and the second receiving means, into IF signals in a frequency band which do not interfere with each other.

According to a fourth aspect of the present invention, there is provided a receiving method, comprising the steps of: receiving a satellite broadcast; receiving at least one of a cable television broadcast or a ground wave television broadcast; and converting the received satellite broadcasting signals, the received cable television broadcasting signals or the received ground wave television broadcasting signals into IF signals in a frequency band which do not interfere with each other.

According to a fifth aspect of the present invention, there is provided a terminal unit comprising: input means for inputting a plurality of types of IF signals having different frequencies fed from the receiving apparatus; selection means for selecting desired IF signals from the plurality of types of IF signals having different frequencies which are input by the input means; and output means for outputting the IF signals selected by the selection means.

According to a sixth aspect of the present invention, there is provided a receiving method comprising the steps of: inputting a plurality of types of IF signals having different frequencies fed from the receiving apparatus; selecting desired IF signals from the plurality of types of input IF signals having different frequencies; and outputting the selected IF signals.

In the receiving apparatus in accordance with the first aspect of the present invention, multiplexed broadcast waves are received by receiving means, the received multiplexed broadcast waves are separated by separation means into a plurality of types of broadcast waves, the plurality of types of broadcast waves separated by the separation means are converted into IF signals of mutually different frequencies by conversion means, and the IF signals converted by the conversion means are output to a processing section by output means.

In the receiving method in accordance with the second aspect of the present invention, multiplexed broadcast waves are received, the received multiplexed broadcast waves are separated into a plurality of types of broadcast waves, and the plurality of types of separated broadcast waves are converted into IF signals of mutually different frequencies.

In the receiving apparatus in accordance with the third aspect of the present invention, a satellite broadcast is received by first receiving means, at least one of a cable television broadcast and a ground wave television broadcast is received by second receiving means, and the satellite broadcasting signals, the cable television broadcasting signals, or the ground wave television broadcasting signals, received by the first and second receiving means, are converted by conversion means into IF signals in a frequency band which do not interfere with each other.

In the receiving method in accordance with the fourth aspect of the present invention, a satellite broadcast is received, at least one of a cable television broadcast and a ground wave television broadcast is received, and the received satellite broadcasting signals, the received cable television broadcasting signals or the received ground wave television broadcasting signals are converted into signals in a frequency band which do not interfere with each other.

In the terminal unit in accordance with the fifth aspect of the present invention, a plurality of types of IF signals having different frequencies fed from a receiving apparatus are input by input means, desired IF signals are selected by selection means from a plurality of types of IF signals having different frequencies input by input means, and the IF signals selected by the selection means are output by output means.

In the receiving method in accordance with the sixth aspect of the present invention, a plurality of types of IF signals having different frequencies fed from the receiving apparatus are input, desired IF signals are selected from a plurality of types of input IF signals having different frequencies, and the selected IF signals are output.

The above and further objects, aspects and novel features of the invention will become more apparent from the following detailed description when read in connection with the accompanying drawings.

BRIEF DESCRIPTION OF THE DRAWINGS

FIGS. 3A–3D show signals of the main section of the embodiment shown in FIG. 2;

FIGS. 5A, 5B, 5C and 5D show signals of the main section of the embodiment shown in FIG. 4;

FIGS. 6A and 6B show intermodulation distortion which occurs in an IF down converter;

DESCRIPTION OF THE PREFERRED EMBODIMENTS

In the following description, the summary of the arrangement of an embodiment of a community receiving apparatus and a terminal unit according to the present invention will be described first, and then each of the community receiving apparatus and the terminal unit will be described in more detail.

Figure 1:
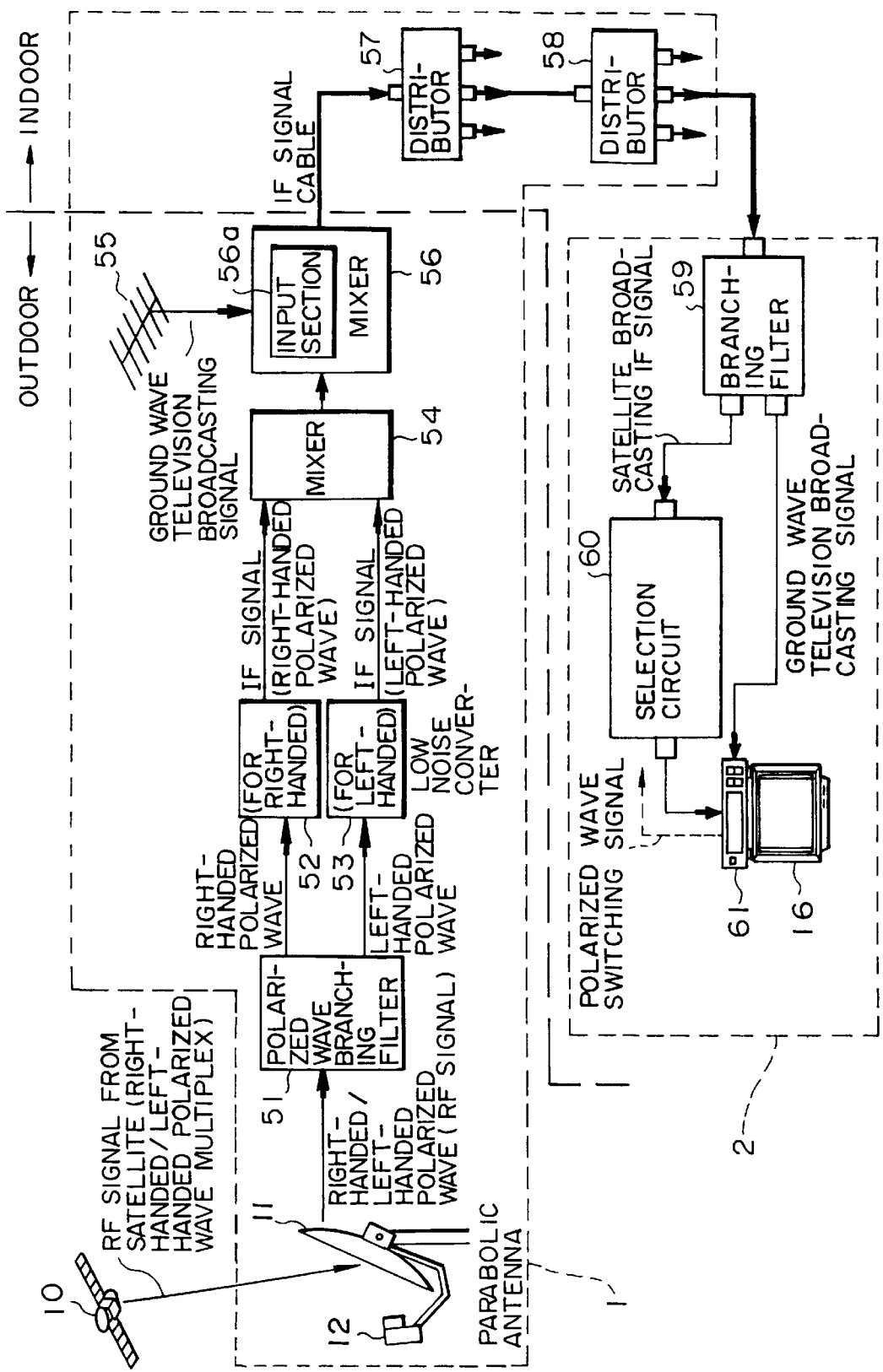
FIG. 1 is a block diagram illustrating the arrangement of an embodiment of a receiving apparatus and a terminal unit according to the present invention.

FIG. 1 is a block diagram illustrating the arrangement of an embodiment of a receiving apparatus and a terminal unit according to the present invention.

In FIG. 1, a broadcast satellite 10 transmits radio waves in an RF band multiplexed by adding different information to left-handed polarized waves and right-handed polarized waves toward the ground of the earth. A community receiving apparatus 1 receives radio waves transmitted from the broadcast satellite 10 and ground wave television waves and distribute the received signals to a terminal unit 2 of each viewer (each household). The terminal unit 2 inputs signals fed from the community receiving apparatus 1 and demodulates the signals.

A parabolic antenna 11 of the community receiving apparatus 1 reflects radio waves transmitted from the broadcast satellite 10 by the parabolic reflection surface and receives the radio waves. An LNB converter 12 separates the radio waves in the RF band received by the parabolic antenna 11 into radio waves of the left-handed polarized waves and radio waves of the right-handed polarized waves, converts those waves into IF signals, respectively, and outputs the IF signals.

Incidentally, a polarized-wave branching filter 51, a low noise converter 52, and a low noise converter 53, which will be described later, are contained in the LNB converter 12 in the actual arrangement. However, these are shown separately in order to describe the state of processing of signals in detail.

The polarized-wave branching filter 51 separates the radio waves in the RF band received by the parabolic antenna 11 into left-handed and right-handed polarized-wave components. After the left-handed and right-handed polarized-wave components fed from the polarized-wave branching filter 51 are amplified by a low-noise amplifier, the low noise converters 52 and 53 convert the polarized waves components into signals in different IF bands.

The mixer 54 mixes together the IF signals corresponding to the right-handed polarized waves and the left-handed polarized waves fed from the low noise converters 52 and 53. An antenna 55 for a ground wave television broadcast receives ground wave television broadcast waves (radio waves in the UHF and VHF bands). The mixer 56 mixes IF signals in which the right-handed polarized waves and left-handed polarized waves fed from the mixer 54 are mixed with ground wave television broadcasting signals which are fed from the antenna 55 for a ground wave television broadcast and which are input to an input section 56a and outputs them through IF signal cables. Distributors 57 and 58 distribute signals output from the mixer 56 to each terminal unit 2.

A branching filter 59 of the terminal unit 2 is disposed in the household of each viewer and is designed to separate signals fed from the a distributor 58 into ground wave television broadcasting signals and IF signals of the satellite broadcast and output the signals.

A selection circuit 60 inputs the IF signals of the satellite broadcast fed from the branching filter 59, selects the IF signals of the right-handed polarized waves or the left-handed polarized waves according to a polarized-wave switching signal fed from a receiver 61, and performs a predetermined frequency conversion on the IF signals, after which the selection circuit 60 outputs the signals to the receiver 61.

The receiver 61 selects any one type of the ground wave television broadcasting signals, the right-handed polarized wave signals and the left-handed polarized wave signals based on the operation by the viewer, and performs a predetermined process on these signals, and finally outputs the signals to the television receiver 16. Also, the television receiver 16 extracts video and sound signals from the signals fed from the receiver 61 and outputs the signals to make a display.

The operation of the example described above will be described below.

Radio waves in which right-handed and left-handed polarized radio waves are multiplexed, transmitted from the broadcast satellite 10, are received by the parabolic antenna 11 and separated into the right-handed and left-handed polarized wave components by the polarized-wave branching filter 51 contained in the LNB converter 12. Then, after the right-handed and left-handed polarized wave components are amplified by the low noise converters 52 and 53, respectively, the polarized waves components are converted into IF signals of different frequencies and output to the mixer 54.

The mixer 54 mixes the IF signals corresponding to the right-handed and left-handed polarized waves fed from the low noise converters 52 and 53, respectively, and outputs the mixed IF signals to the mixer 56. The mixer 56 mixes the ground wave television broadcasting signals which are received by the antenna 55 for a ground wave television broadcast and which is input to the input section 56a with the IF signals, in which the right-handed and left-handed polarized waves are mixed, fed from the mixer 54, and outputs the mixed signals.

The signals output from the mixer 56 are input to indoors through an IF signal cable and distributed to each terminal unit 2 by the distributors 57 and 58.

The branching filter 59 separates the signals fed from the distributor 58 into ground wave television broadcasting signals and IF signals of the satellite broadcast. Then, the ground wave television broadcasting signals are output to the receiver 61, and the IF signals of the satellite broadcast are output to the selection circuit 60.

The selection circuit 60 extracts IF signals corresponding to the right-handed and left-handed polarized waves from the IF signals of the satellite broadcast fed from the branching filter 59. Then, the selection circuit 60 selects the right-handed or left-handed polarized waves in accordance with the polarized wave switching signal fed from the receiver 61 and performs a predetermined frequency conversion thereon, and finally outputs the selected polarized waves to the receiver 61.

The receiver 61 selects any one type of the ground wave television broadcasting signals, the IF signals corresponding to the right-handed polarized waves and the IF signals corresponding to the left-handed polarized waves based on the operation by the viewer, and outputs the signals to the television receiver 16.

In a case in which a program contained in the ground wave television broadcasting signal is selected by the viewer, the receiver 61 feeds the ground wave television broadcasting signals fed from the branching filter 59 to the television receiver 16.

Also, in a case in which a program contained in the right-handed polarized waves is selected by the viewer, the receiver 61 feeds a polarized wave switching signal for selecting right-handed polarized waves to the selection circuit 60, and IF signals corresponding to the right-handed polarized waves which are output thereby are fed to the television receiver 16. In a case in which a program contained in the left-handed polarized waves is selected by the viewer, the receiver 61 feeds a polarized wave switching signal for selecting left-handed polarized waves to the selection circuit 60, and IF signals corresponding to the left-handed polarized waves which are output thereby are fed to the television receiver 16.

With the above-described arrangement, the right-handed and left-handed polarized wave components of the satellite broadcast are converted into IF signals which do not interfere with each other by the low noise converters 52 and 53, and the right-handed polarized waves, the left-handed polarized waves and the ground wave television broadcasting signals are mixed to a single type of signals by the mixers 54 and 56. Therefore, three types of different signals can be fed to each terminal unit 2 disposed indoors through a single cable. As a result, for example, in a multi-family housing area or the like where a system for distributing ground wave television signals or CATV broadcasting signals to each household has already been provided, not only are cables not needed to be laid newly, but also these three types of signals can be collectively handled when setup is changed so as to newly receive a satellite broadcast. Thus, it becomes not necessary to dispose distributors 57 and 58 individually for each signal.

Next, the arrangement of the community receiving apparatus 1 of the above community receiving system will be described below in greater detail.

Figure 2:
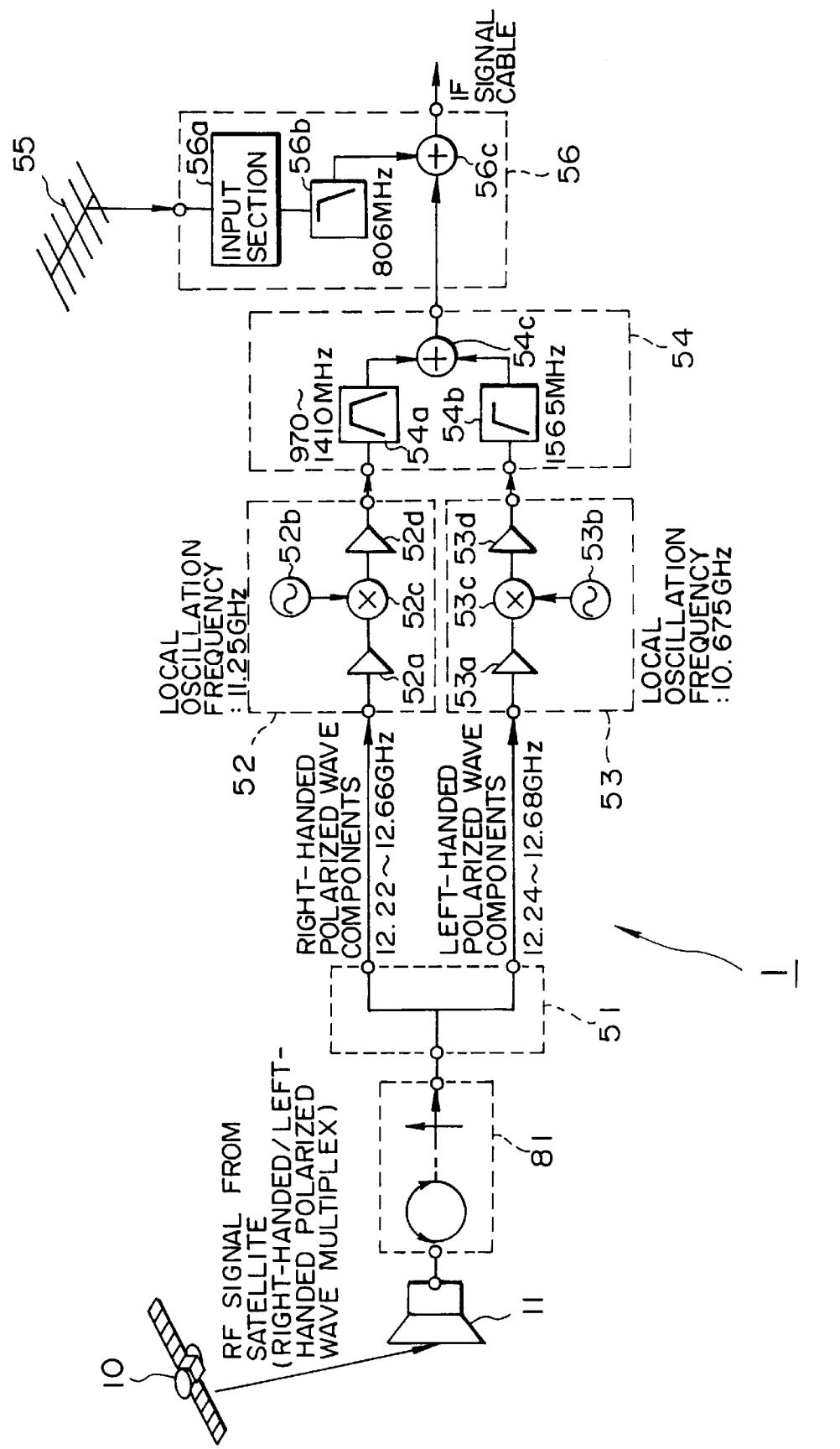
FIG. 2 is a block diagram illustrating in more detail an example of the arrangement of the receiving apparatus shown in FIG. 1.

FIG. 2 is a block diagram illustrating in more detail the arrangement of the receiving apparatus 1 shown in FIG. 1. Those components in FIG. 2 which are the same as those in FIG. 1 are given the same reference numerals and, therefore, a description thereof is omitted.

A circularly polarized-wave generator 81 converts right-handed polarized waves of 12.22 to 12.66 GHz and left-handed polarized waves of 12.24 to 12.68 GHz, which are contained in the radio waves received by the parabolic antenna 11, into horizontally and vertically polarized waves, respectively. A polarized-wave branching filter 51 extracts right-handed and left-handed polarized wave components from the horizontally and vertically polarized waves fed from the circularly polarized-wave generator 81 and feeds the right-handed polarized wave components to a low noise converter 52 and the left-handed polarized wave components to a low noise converter 53.

The low noise converter 52 comprises a low-noise amplifier 52a for amplifying right-handed polarized waves fed from the polarized-wave branching filter 51, a local oscillator 52b having a frequency (local oscillation frequency) of 11.25 GHz, a multiplier 52c for performing a process of multiplying together signals fed from the low-noise amplifier 52a and the local oscillator 52b, and a buffer 52d for amplifying the power of an output signal of the multiplier 52c.

The low noise converter 53 comprises a low-noise amplifier 53a for amplifying left-handed polarized waves fed from the polarized-wave branching filter 51, a local oscillator 53b having a frequency of 10.675 GHz, a multiplier 53c for performing a process of multiplying together signals fed from the low-noise amplifier 53a and the local oscillator 53b, and a buffer 53d for amplifying the power of an output signal of the multiplier 53c.

The local oscillation frequency (=11.25 GHz) of the local oscillator 52b of the low noise converter 52 is the same frequency in the case of individual reception (a case in which a parabolic antenna is set up individually for reception for each household). On the other hand, for the local oscillation frequency (=10.675 GHz) of the local oscillator 53b of the low noise converter 53, a frequency which does not interfere with the local frequency of the local oscillator 52b is selected.

The mixer 54 comprises a band-path filter 54a for allowing only signals in the band of 970 to 1410 MHz from among the right-handed polarized-wave components to pass, a high-path filter 54b for allowing only signals of 1565 MHz or higher from among the left-handed polarized-wave components to pass, and an adder 54c for adding together signals output from the band-path filter 54a and the high-path filter 54b.

The mixer 56 comprises an input section 56a for inputting ground wave television broadcasting signals fed from the antenna 55 for a ground wave television broadcast, a low-path filter 56b for allowing only signals of 806 MHz or lower from among the signals input to the input section 56a to pass, and an adder 56c for adding together signals fed from the mixer 54 and the low-path filter 56b.

The operation of this embodiment will now be described.

FIGS. 3A and 3B show signals of the main section of the embodiment shown in FIG. 2. Referring to the signals shown in FIGS. 3A and 3B, the operation of the embodiment of FIG. 2 will be described below.

Radio waves (FIG. 3A) in which right-handed polarized waves (12.22 to 12.66 GHz) and left-handed polarized waves (12.24 to 12.68 GHz) which are transmitted from the broadcast satellite 10 are multiplexed are received by the parabolic antenna 11 and fed to the circularly polarized-wave generator 81. The circularly polarized-wave generator 81 converts the right-handed and left-handed polarized waves contained in the received radio waves into horizontally and vertically polarized waves and feeds them to the polarized-wave branching filter 51. The polarized-wave branching filter 51 separates the horizontally and vertically polarized waves into right-handed polarized waves (FIG. 3B) and left-handed polarized waves (FIG. 3C) and feeds them to the low noise converters 52 and 53, respectively.

The right-handed polarized waves (FIG. 3B) fed to the low noise converter 52 are amplified by the amplifier 52a.

The amplified signals are multiplied by signals of 11.25 GHz fed from the local oscillation oscillator 52b by the multiplier 52c. As a result, the right-handed polarized-wave components (FIG. 3B) having a frequency band of 12.22 to 12.66 GHz are converted into IF signals of 970 MHz (=12.22 GHz−11.25 GHz) to 1410 MHz (=12.66 GHz−11.25 GHz). Then, the power thereof is amplified by the buffer 52d, and then output.

On the other hand, the left-handed polarized-wave components (FIG. 3C) fed to the low noise converter 53 are amplified by the amplifier 53a. The amplified signals are multiplied by signals of 10.675 GHz fed from the local oscillator 53b by the multiplier 53c. As a result, the left-handed polarized-wave components (FIG. 3C) having a frequency band of 12.24 to 12.68 GHz are converted into IF signals of 1565 MHz (=12.24 GHz−10.675 GHz) to 2005 MHz (=12.68 GHz−10.675 GHz). Then, the power thereof is amplified by the buffer 53d, and then output.

The signals output from the low noise converter 52 are fed to the band-path filter 54a having a pass band of 970 to 1410 MHz, whereby the signals other than the right-handed polarized-wave components are removed. Also, the signals output from the low noise converter 53 are fed to the high-path filter 54b having a cut-off frequency of 1565 MHz, whereby the signals other than the left-handed polarized waves-handed polarized-wave components are similarly removed. Then, the right-handed and left-handed polarized-wave components are added together by the adder 54c and output to the mixer 56.

The ground wave television broadcasting signals received by the antenna 55 for a ground wave television broadcast are input to the input section 56a and then fed to a low-path filter 56b having a cut-off frequency of 806 MHz. After signals other than the ground wave television broadcasting signals are removed, the signals are added to the signals output from the mixer 54 by the adder 56c, causing IF signals (FIG. 3D) to be formed. Then, these IF signals are distributed to each terminal unit 2 through an IF signal cable.

With the above-described arrangement, as shown in FIG. 3D, the right-handed polarized-wave components of the satellite broadcast, the left-handed polarized-wave components of the satellite broadcast, and the ground wave television broadcasting signals are converted into signals of frequencies which do not interfere with each other, are mixed to each other, and then output. Therefore, it becomes possible to transmit the signals through a single IF signal cable.

Next, the arrangement of the terminal unit 2 will be described in detail.

Figure 4:
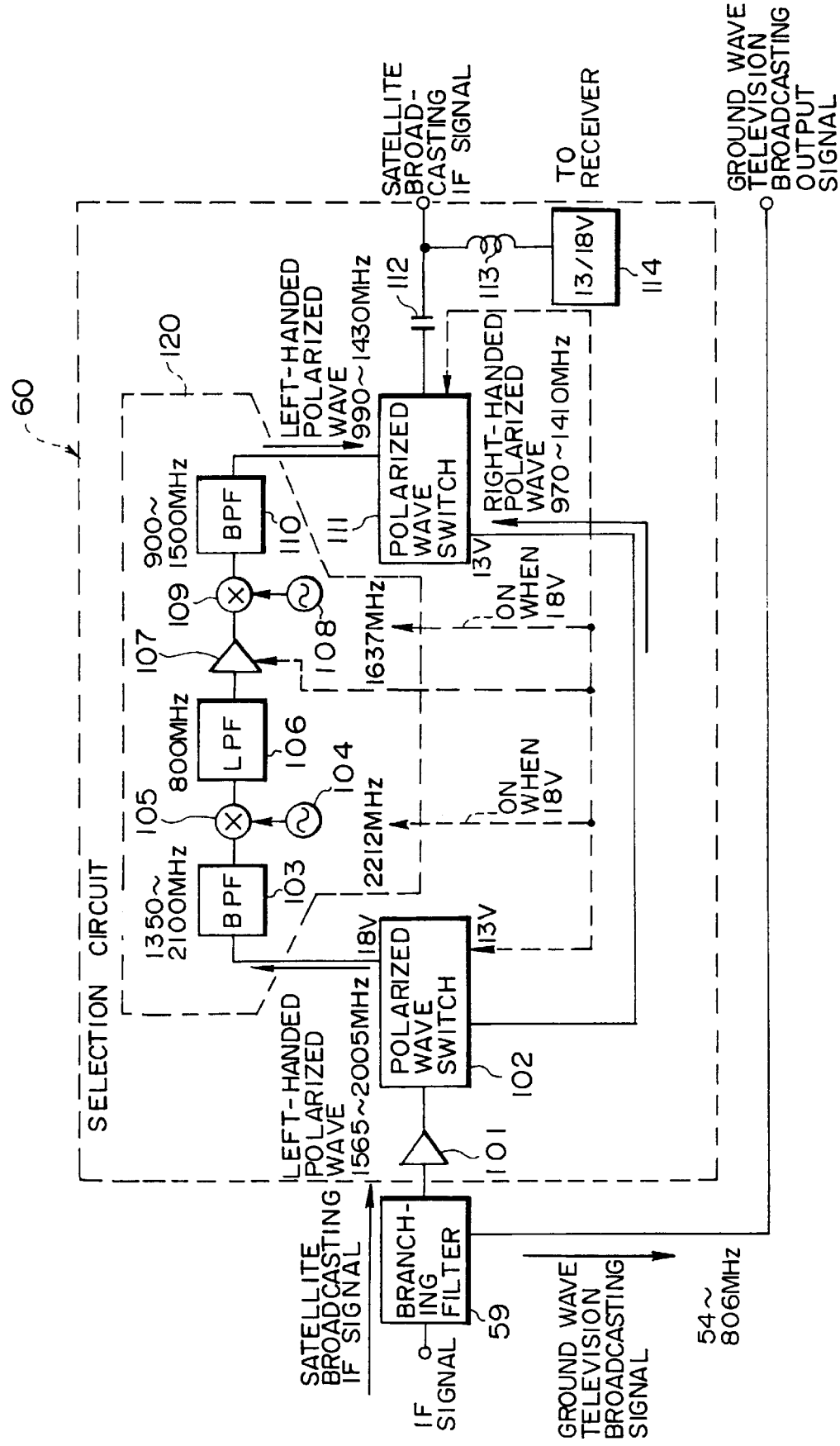
FIG. 4 is a block diagram illustrating in more detail an example of the arrangement of the terminal unit shown in FIG. 1.

FIG. 4 is a block diagram illustrating in greater detail the arrangement of the terminal unit shown in FIG. 1. Referring to FIG. 4, a description will be given below.

In the block diagram of FIG. 4, the illustration of the receiver 61 and the television receiver 16 is omitted for the sake of simplicity, and only the block diagram of the branching filter 59 and the selection circuit 60 is shown.

In FIG. 4, the branching filter 59 separates the input IF signals into the ground wave television broadcasting signals and the IF signals of the satellite broadcast. The ground wave television broadcasting signals output from the branching filter 59 are fed to the receiver 61, while the IF signals of the satellite broadcast are fed to an amplifier 101.

The amplifier 101 amplifies the IF signals of the satellite broadcast output from the branching filter 59 and feeds the amplified signals to a polarized-wave switch 102. The polarized-wave switch 102 extracts IF signals corresponding to the right-handed polarized waves from the IF signals of the satellite broadcast and feeds them to a polarized-wave switch 111 when a switching voltage (equivalent to a polarized wave switching signal) fed from the receiver 61 is 13 V. Also, when the switching voltage is 18 V, the polarized-wave switch 102 extracts IF signals corresponding to the left-handed polarized waves from the IF signals of the satellite broadcast and feeds them to an IF down converter 120.

A band-path filter (BPF) 103 of the IF down converter 120 has a pass band of 1350 to 2100 MHz and prevents (generally called image removal) the signal components in the image band [3777 (=1565+2212) MHz to 4217 (=2005+ 2212) MHz] from being converted again and output at the local oscillation frequency of 2212 MHz, which occurs in the frequency conversion at the local oscillation frequency of 2212 MHz which will be described later. Further, the band-path filter 103 has the effect of removing signal components other than the left-handed polarized waves.

A multiplier 105 multiplies the output signals of a local oscillator 104 having a local oscillation frequency of 2212 MHz by the output signals of the band-path filter 103. A low-path filter (LPF) 106 outputs only signals of a cut-off frequency or lower from among the output signals of the multiplier 105. An amplifier 107 amplifies the output signals of the low-path filter 106.

A multiplier 109 multiplies signals fed from a local oscillator 108 having an oscillation frequency of 1637 MHz by signals output from the amplifier 107. A band-path filter 110 extracts signals in a frequency band of 900 to 1500 MHz from among the signals output from the multiplier 109 and outputs the extracted signals to the polarized-wave switch 111.

The polarized-wave switch 111, similarly to the above-described polarized-wave switch 102, selectively outputs IF signals corresponding to the right-handed polarized waves fed from the polarized-wave switch 102 when the switching voltage fed from the receiver 61 is 13 V. When, on the other hand, the switching voltage is 18 V, the polarized-wave switch 111 selectively outputs IF signals corresponding to the left-handed polarized waves fed from the IF down converter 120.

A capacitor 112 cuts off DC components contained in the signals so as to prevent the selection circuit 60 and the receiver 61 from affecting each other. Further, a coil 113 prevents IF signals (high-frequency signals) corresponding to the right-handed and left-handed polarized waves from exerting an influence upon a power-supply section 114. The power-supply section 114 outputs a power voltage of 13 V or 18 V in accordance with the switching voltage fed from the receiver 61.

FIGS. 5A, 5B, 5C and 5D show signals of the main section of the embodiment shown in FIG. 4. The operation of this embodiment of FIG. 4 will be described below with reference to FIGS. 5A, 5B, 5C and 5D.

The IF signals (FIG. 5A) fed from the distributor 58 shown in FIG. 1 are separated into ground wave television broadcasting signals and IF signals of the satellite broadcast. Then, the ground wave television broadcasting signals are output to the receiver 61 as branching filter output signals (FIG. 5B). On the other hand, the IF signals of the satellite broadcast are fed to the amplifier 101 where the signals are amplified, and then fed to the polarized-wave switch 102.

The polarized-wave switch 102 extracts IF signals corresponding to the right-handed polarized waves from among the IF signals of the satellite broadcast fed from the amplifier 101 when the switching voltage fed from the receiver 61 is 13 V and outputs the extracted IF signals to the polarized-wave switch 111. When, on the other hand, the switching voltage is 18 V, the polarized-wave switch 102 extracts IF signals corresponding to the left-handed polarized waves from among the IF signals of the satellite broadcast and feeds the extracted IF signals to the IF down converter 120.

The band-path filter 103 of the IF down converter 120 allows signals in the frequency band of 1350 to 2100 MHz from among the IF signals (1565 to 2005 MHz) corresponding to the left-handed polarized waves fed from the polarized-wave switch 102 to pass and outputs them to the multiplier 105. As a result, in the manner described above, the frequency components in the image band can be prevented from being output.

The multiplier 105 multiplies the output signals of the local oscillator 104 having an oscillation frequency of 2212 MHz by the output signals of the band-path filter 103 and outputs the signals. As a result of this multiplication, the frequency band of the IF signals of the left-handed polarized waves is down-converted from the range of 1565 MHz to the 2005 MHz to the range of 207 MHz=(2212 MHz–2005 MHz) to 647 MHz (=2212 MHz–1565 MHz).

The down-converted IF signals (the output signals of the multiplier 105) of the left-handed polarized waves are input to the low-path filter 106 having a cut-off frequency of 800 MHz where unwanted harmonic components are removed. Then, after the IF signals are amplified by the amplifier 107, the signals are input to the multiplier 109.

The multiplier 109 multiplies the output signals of the local oscillator 108 having an oscillation frequency of 1637 MHz by the output signals of the amplifier 107 and outputs the signals. As a result of this multiplication, the frequency band of the IF signals corresponding to the left-handed polarized waves fed from the amplifier 107 is up-converted from the range of 207 to 647 MHz to the range of 990 MHz=(1637 MHz–647 MHz) to 1430 MHz (=1637 MHz to 207 MHz).

The up-converted IF signals (the output signals of the multiplier 109) corresponding to the left-handed polarized waves are input to the band-path filter 110 having a pass band of 900 to 1500 MHz where unwanted low-frequency and high-frequency components are removed, and then input to the polarized-wave switch 111 as the output signals of the IF down converter 120.

The polarized-wave switch 111 selects signals (IF signals corresponding to the right-handed polarized waves) fed from the polarized-wave switch 102 and outputs the signals when the switching voltage fed from the receiver 61 is 13 V (FIG. 5C). When, on the other hand, the switching voltage is 18 V, the polarized-wave switch 111 selects signals (IF signals corresponding to the left-handed polarized waves) fed from the IF down converter 120 (FIG. 5D) and outputs the signals.

The signals output from the polarized-wave switch 111 are fed to the receiver 61 via the capacitor 112.

With the above-described arrangement, when the viewer performs a predetermined operation via the receiver 61, it becomes possible to select a program contained in the ground wave television broadcast, the right-handed polarized waves of the satellite broadcast or the left-handed polarized waves of the satellite broadcast and demodulate it.

FIG. 6A is a plot of the respective outputs 2212 MHz and 1637 MHz of the local oscillators 104 and 108 of the IF down converter 120 shown in FIG. 4 on the frequency axis (horizontal axis). If these signals of different frequencies modulate each other, intermodulation distortion occurs.

FIG. 6B shows the relationship between the left-handed polarized-wave components (990 to 1430 MHz) after being down-converted by the IF down converter 120 and intermodulation distortion. Intermodulation distortion is formed from frequency components of the sum of a multiple of the frequency of each signal and the difference thereof. Therefore, distortion of 575 MHz, which is a frequency of the difference between 1637 MHz and 2212 MHz of the two local oscillation frequencies, occurs. Further, as a result of the intermodulation of the local oscillation frequencies of the 575 MHz and 1637 MHz, distortion components of 1062 MHz, which is the frequency of the difference, occurs. Furthermore, distortion components of 1150 MHz, which is a second-order higher harmonic of the above-described 575 MHz, occurs.

These distortion components are superposed onto the left-handed polarized-wave components. Therefore, in order not to exert an influence upon a broadcasting program, it is preferable to set the local oscillation frequency of the local oscillators 104 and 108 so that these intermodulation distortion components (1150 MHz or 1062 MHz) are positioned between the channels of the left-handed polarized-wave components (between the 1130 MHz channel and the 1160 MHz channel or between the 1020 MHz channel and the 1080 MHz channel).

As described above, in the terminal unit 2, when signal frequency conversion is performed by using two different local oscillation frequencies, it is possible to position intermodulation distortion between the channels of the broadcasting signals by properly setting the local oscillation frequency. As a result, it becomes possible to suppress the influence exerted upon the broadcasting signals by the intermodulation distortion.

The intermodulation distortion of 575 MHz can be removed by the band-path filter 54a in the low noise block. Also, since not only can the intermodulation distortion be removed by the filter 103, but also since the amplifier 101 functions as an attenuator for an inverse number of amplification gain with respect to the intermodulation distortion, the influence of the intermodulation distortion is small.

In the IF down converter 120 shown in FIG. 4, down-conversion is performed at the local oscillation frequency of 2212 MHz and, in contrast, up-conversion is performed at the local oscillation frequency of 1637 MHz. Consequently, down-conversion of 575 MHz is achieved. A method of performing frequency conversion of signals through two different steps in the above-described way is called double conversion. This method has advantages described below as compared with single conversion in which the frequency of a signal is converted at one time.

(a) In the single conversion, a local oscillation frequency of 575 MHz is used. Since this frequency is positioned within the frequency band of the ground wave television broadcast and the level of this signal is great, for example, approximately +10 dBmW (decibel milliwatt), the signal may exert an influence upon the broadcasting signals. On the other hand, in the double conversion, since the two local oscillation frequencies (2212 and 1637 MHz) are out of the band of the frequency band (9990 to 1430 MHz) of the obtained left-handed polarized wave signals, the signal does not exert an influence upon the broadcasting signals.

(b) In the case of the single conversion, since the right-handed polarized waves of the basic signal must be suppressed by 30 dB or more with respect to the left-handed polarized waves, it is required to insert a high-path filter with a sharp characteristic having a cut-off frequency in the range of 1410 to 1565 MHz. However, it is difficult to form a high-path filter with a sharp characteristic at a low cost in this frequency band. On the other hand, in the double conversion, it is possible to form the high-path filter by dividing it into a plurality of filters. Thus, each filter needs not to have so sharp a characteristic.

Although in this embodiment satellite broadcast waves which are multiplexed by right-handed and left-handed polarized waves are used, of course, satellite broadcast waves which are multiplexed by horizontally and vertically polarized waves may be used.

In the selection circuit 60 shown in FIG. 4, the IF down converter 120 is provided so as to perform frequency conversion of left-handed polarized waves. However, if the input frequency band of the receiver 61 is made to correspond to the frequency band (1565 to 2005 MHz) of the left-handed polarized waves, the IF down converter 120 can be omitted.

Figure 7:
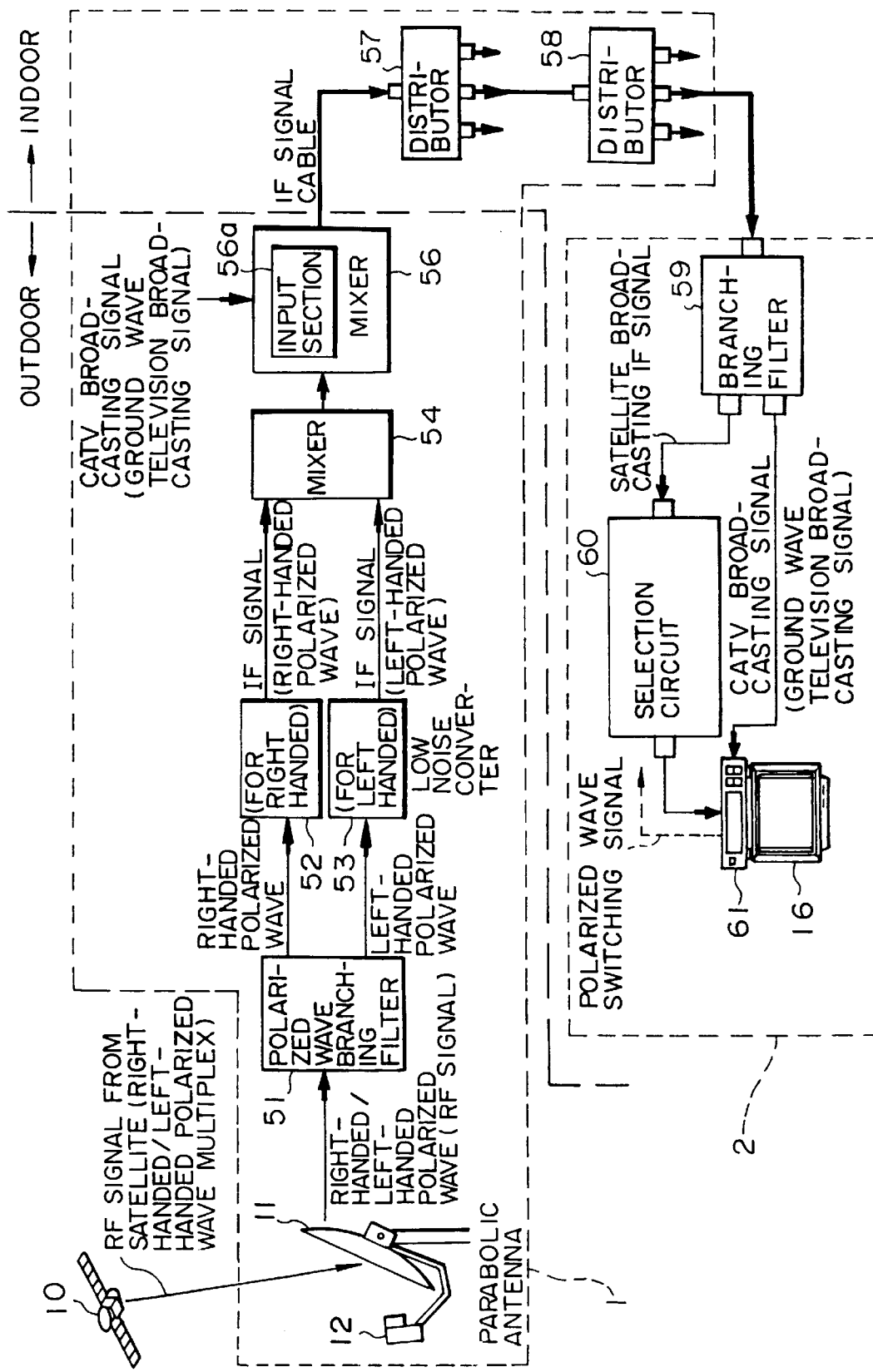
FIG. 7 is a block diagram illustrating the arrangement of another embodiment of a receiving apparatus and a terminal unit according to the present invention.
Figure 8:
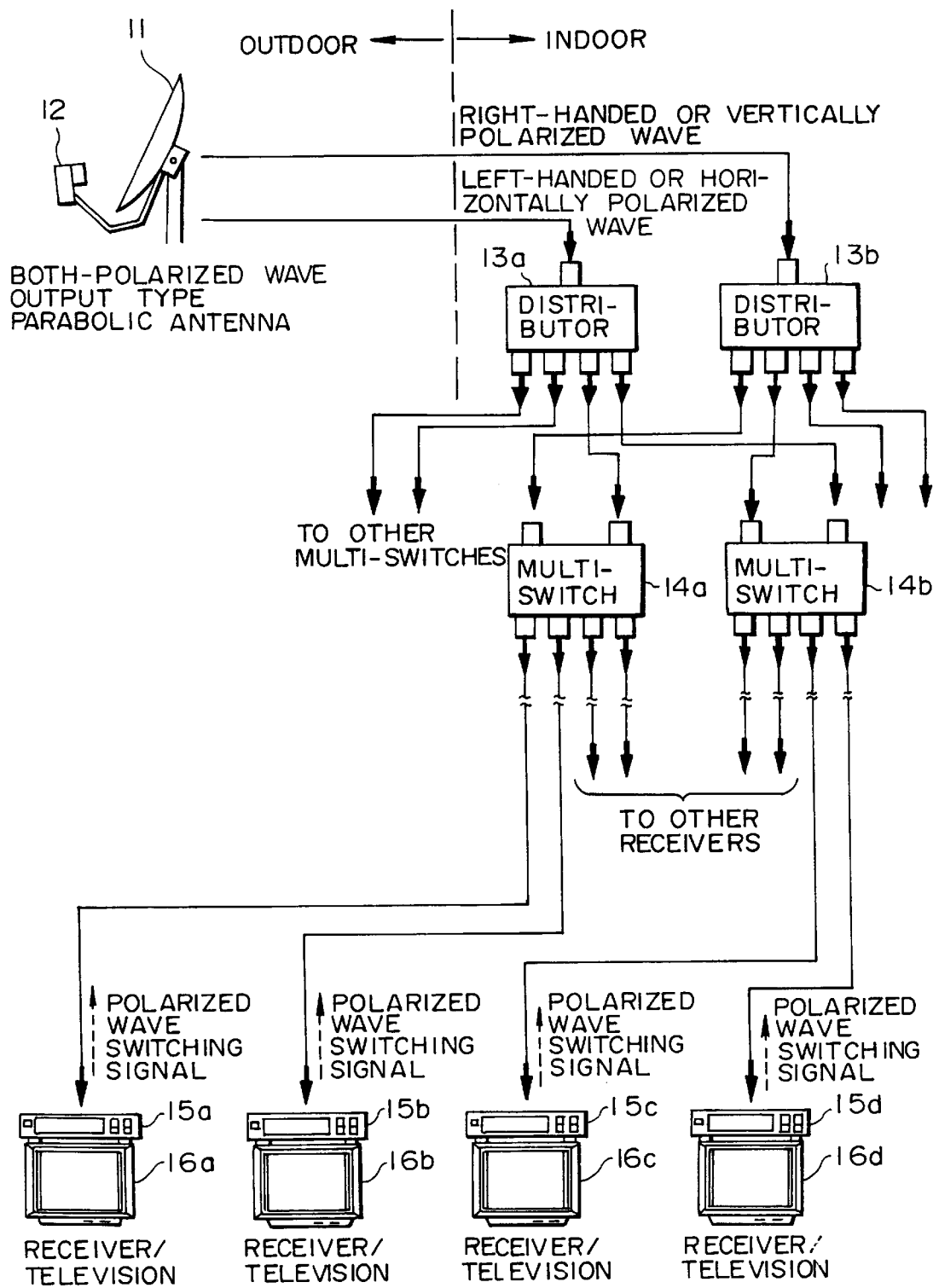
FIG. 8 is a block diagram illustrating an example of the arrangement of a conventional receiving apparatus and a conventional terminal unit.
Figure 9:
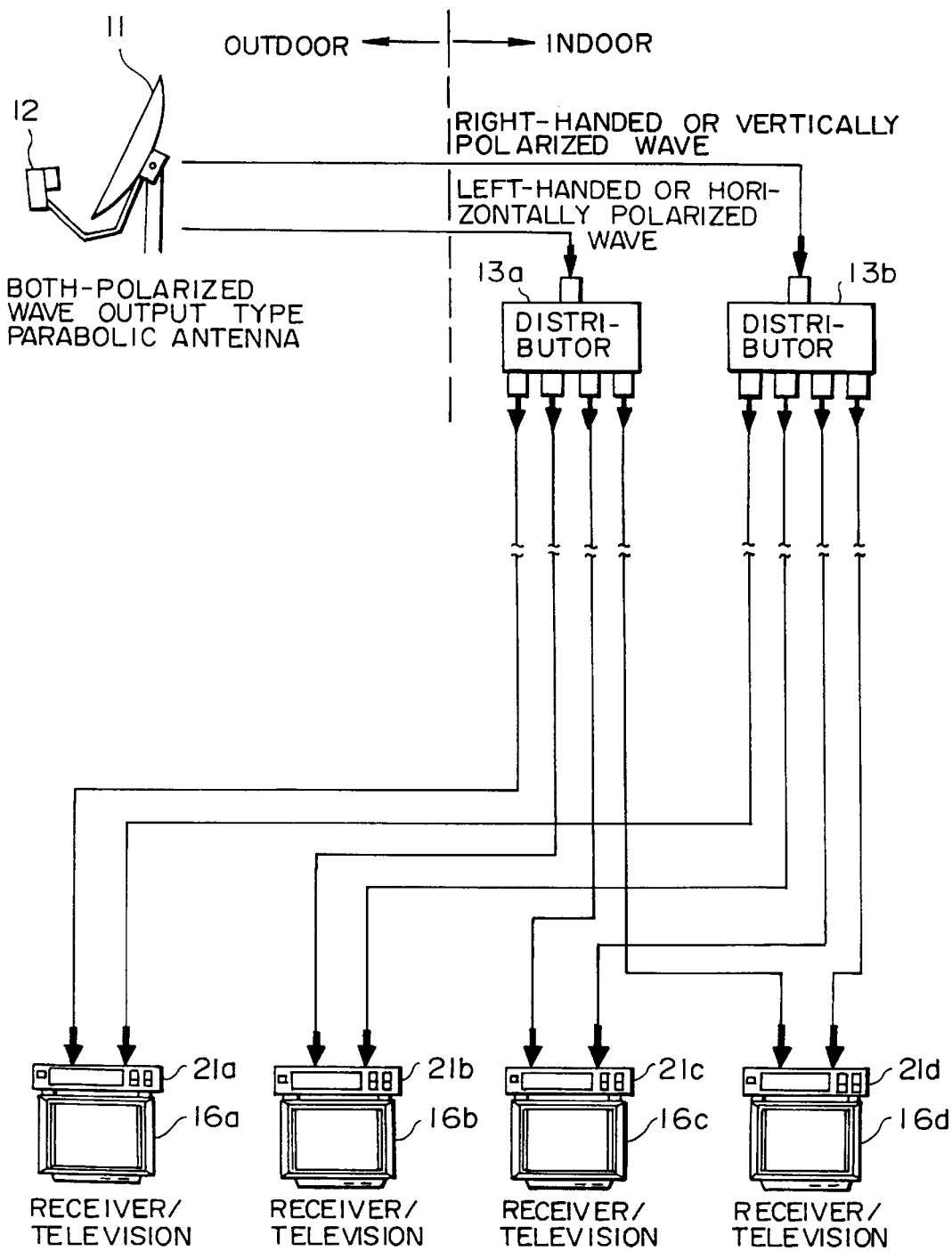
FIG. 9 is a block diagram illustrating another example of the arrangement of the conventional receiving apparatus and the conventional terminal unit.

FIG. 7 is a block diagram illustrating the arrangement of another embodiment of a receiving apparatus and a terminal unit according to the present invention. In this embodiment, CATV (Cable Television) broadcasts including ground wave television broadcasts can be received. Those components in FIG. 7 which are the same as those in FIG. 1 are given the same reference numerals and, therefore, a description thereof is omitted.

In FIG. 7, the mixer 56 mixes the IF signals of the satellite broadcast fed from the mixer 54 with the CATV broadcasting signals fed from the cable (not shown) connected to the input section 56a and outputs the mixed signals. Further, the low noise converters 52 and 53 convert frequency so that IF signals of the right-handed polarized waves, IF signals of the left-handed polarized waves, and CATV broadcasting signals do not interfere with each other.

The branching filter 59 separates the IF signals fed from the distributor 58 into IF signals of the satellite broadcast and CATV signals. Then, the branching filter 59 feeds the IF signals of the satellite broadcast to the selection circuit 60 and the CATV broadcasting signals to the receiver 61.

Other points of this arrangement are the same as those of the case in FIG. 1.

According to this embodiment, it is possible to receive CATV broadcasts in addition to multiplexed satellite broadcasts and distribute these to each terminal unit 2 over a single IF signal cable. Additionally, the selection circuit 60 can be contained in the receiver 61.

According to the receiving apparatus in accordance with the first aspect of the present invention and the receiving method in accordance with the second aspect of the present invention, multiplexed broadcast radio waves are received, the received multiplexed broadcast radio waves are separated into a plurality of types of broadcast radio waves, the plurality of types of separated broadcast radio waves are converted into IF signals of mutually different frequencies, and the converted IF signals are output to the processing section. Thus, it becomes possible to transmit multiplexed broadcast radio waves over a single cable, obviating the need to newly lay cables. Further, since a plurality of types of IF signals can be handled as a single type of signals, it becomes possible to decrease the number of distributors for distributing signals, or the like.

According to the receiving apparatus in accordance with the third aspect of the present invention and the receiving method in accordance with the fourth aspect of the present invention, a satellite broadcast is received, at least one of the cable television broadcast and the ground wave television broadcast is received, and the received satellite broadcasting signals, cable television broadcasting signals, or ground wave television broadcasting signals are converted into signals in the frequency band which do not interfere with each other. Thus, it becomes possible to receive a satellite broadcast by using the existing separation apparatus and the existing IF cable.

According to the terminal unit in accordance with the fifth aspect of the present invention and the receiving method in accordance with the sixth aspect of the present invention, a plurality of types of IF signals of different frequencies fed from the community receiving apparatus are input, desired IF signals are selected from the plurality of types of input IF signals of different frequencies, and the selected IF signals are output. Thus, it is possible to surely receive a multiplexed broadcast.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A terminal unit which inputs a plurality of IF signals from a receiving apparatus which receives a plurality of multiplexed broadcast waves and which converts said plurality of multiplexed broadcast waves into a plurality of types of IF signals having different frequencies and adds and outputs the plurality of types of IF signals, said terminal unit comprising:

input means for inputting said plurality of types of IF signals having different frequencies fed from said receiving apparatus;

selection means for selecting one of the IF signals from said plurality of types of IF signals having different frequencies which are input by said input means;

output means for outputting said IF signals selected by said selection means; and conversion means for converting said IF signals into signals having respective predetermined frequencies, wherein said conversion means has a plurality of local oscillators for converting frequency, and the frequency of a plurality of signals output from said local oscillator is set so that a frequency of intermodulation distortion occurring as a result of mutual interference of said plurality of signals is positioned between frequency channels corresponding to said IF signals.

2. A receiving system comprising:

community receiving means and a plurality of terminal units, said community receiving means including first receiving means for receiving a plurality of multiplexed broadcast waves;

first separation means for separating said plurality of multiplexed broadcast waves received by said receiving means into a plurality of types of broadcast waves;

conversion means for converting each of said plurality of types of broadcast waves separated by said separation means into respective IF signals of mutually different frequencies;

first adding means for adding together each of the IF signals of mutually different frequencies;

first output means for outputting at least said plurality of IF signals added together by said adding means; wherein each of said plurality of terminal units for receiving at least said plurality of IF signals output from said community receiving means, includes input means for inputting at least said plurality of types of IF signals having different frequencies fed from said community receiving means;

selection means for selecting desired IF signals from said plurality of types of IF signals having different frequencies which are input by said input means;

second output means for outputting said IF signals selected by said selection means; and a receiver for receiving said IF signals output from said second output means, wherein said selection means selects one of said IF signals according to a polarized-wave switching signal fed from said receiver.

3. The receiving system according to claim 2, wherein said community receiving means is disposed outdoors and said terminal unit is disposed indoors.

4. The receiving system according to claim 2, wherein said community receiving means further comprises second receiving means for receiving at least one of a cable television broadcast signal or a ground wave television broadcast wave, wherein said first receiving means receives said plurality of multiplexed broadcast waves transmitted via a satellite, and said conversion means converts said plurality of types of IF signals into a plurality of IF signals having respective frequencies different from a frequency of said ground wave television broadcast wave or said cable television broadcast signal received by said second receiving means.

5. The receiving system according to claim 2, wherein said first adding means comprises first mixing means for mixing said plurality of types of IF signals converted by said conversion means forming a plurality of first mixed signals.

6. The receiving system according to claim 4, wherein said first adding means further comprises: first mixing means for mixing said plurality of types of IF signals converted by said conversion means and forming a plurality of first mixed signals; and second mixing means for mixing a plurality of signals output from said first mixing means with at least one type of said cable television broadcast signal or ground wave television broadcast wave and forming a plurality of second mixed signals and outputting said plurality of second mixed signals including said plurality of types of IF signals and said cable television broadcast signal or ground wave television broadcast wave.

7. The receiving system according to claim 2, wherein said output means includes distributing means for distributing at least said plurality of signals converted from said conversion means and output from said first output means to each of said plurality of terminal units.

8. The receiving system according to claim 6, wherein each of said plurality of terminal units include second separation means for separating signals output from said community receiving means into said plurality of types of IF signals converted from said plurality of broadcast waves and at least one type of said cable television broadcast signal or ground wave television broadcasting wave.

9. The receiving system according to claim 2, wherein said plurality of multiplexed broadcast waves are RF signals multiplexed with right-handed and left-handed polarized waves.

10. The receiving system according to claim 9, wherein said first separation means separates said plurality of multiplexed broadcast waves received by said receiving means into said right-handed polarized waves and said left-handed polarized waves.

11. The receiving system according to claim 10, wherein said conversion means includes a first conversion means for converting said right-handed polarized waves having a first predetermined range of frequency into right-handed polarized waves having a second predetermined range of frequency and a second conversion means for converting said left-handed polarized waves having a third predetermined range of frequency into left-handed polarized waves having a fourth predetermined range of frequency.

12. The receiving system according to claim 11, wherein said first conversion means includes a first amplifier, a first local oscillator having a first local oscillation frequency, a first multiplier, and a first buffer.

13. The receiving system according to claim 11, wherein said second conversion means includes a second amplifier, a second local oscillator having a second local oscillation frequency, a second multiplier, and a second buffer.

14. A receiving system comprising:

community receiving means and a plurality of terminal units, said community receiving means including first receiving means for receiving a plurality of multiplexed broadcast waves;

first separation means for separating said plurality of multiplexed broadcast waves received by said receiving means into a plurality of types of broadcast waves;

conversion means including first and second local oscillators for converting each of said plurality of types of broadcast waves separated by said separation means into respective IF signals of mutually different frequencies;

first adding means for adding together each of the IF signals of mutually different frequencies; and first output means for outputting at least said plurality of IF signals added together by said adding means; wherein each of said plurality of terminal units for receiving at least said plurality of IF signals output from said community receiving means, includes input means for inputting at least said plurality of types of IF signals having different frequencies fed from said community receiving means;

selection means for selecting desired IF signals from said plurality of types of IF signals having different frequencies which are input by said input means; and second output means for outputting said IF signals selected by said selection means, wherein said selection means includes a third local oscillator having a third local oscillation frequency and a fourth local oscillator having a fourth local oscillation frequency, wherein said third local oscillation frequency is different from said fourth local oscillation frequency.

15. The receiving system according to claim 14, wherein a frequency of intermodulation distortion occurring as a result of mutual interference generated by a difference between said third local oscillation frequency and said fourth local oscillation frequency is positioned between the channels of said IF signals.

16. A terminal unit which inputs a plurality of IF signals from a receiving apparatus which receives a plurality of multiplexed broadcast waves and which converts said plurality of multiplexed broadcast waves into a plurality of types of IF signals having different frequencies and adds and outputs the plurality of types of IF signals, said terminal unit comprising:

input means for inputting said plurality of types of IF signals having different frequencies fed from said receiving apparatus;

selection means for selecting one of the IF signals from said plurality of types of IF signals having different frequencies which are input by said input means;

output means for outputting said IF signals selected by said selection means; and a receiver for receiving said IF signals output from said output means, wherein said selection means selects one of said IF signals according to a polarized-wave switching signal fed from said receiver.

17. The terminal unit according to claim 16 wherein said input means also inputs at least one of a cable television broadcast signal or a ground wave television broadcasting wave, and said terminal unit further comprises second separation means for separating a plurality of signals output from said receiving apparatus into said plurality of types of IF signals converted from said plurality of multiplexed broadcast waves and at least one type of said cable television broadcast signal or ground wave television broadcasting wave.

18. The terminal unit according to claim 16, wherein said terminal unit is located indoors.

19. A terminal unit which inputs a plurality of IF signals from a receiving apparatus which receives a plurality of multiplexed broadcast waves and which converts said plurality of multiplexed broadcast waves into a plurality of types of IF signals having different frequencies and adds and outputs the plurality of types of IF signals, said terminal unit comprising:

input means for inputting said plurality of types of IF signals having different frequencies fed from said receiving apparatus;

selection means for selecting one of the IF signals from said plurality of types of IF signals having different frequencies which are input by said input means;

output means for outputting said IF signals selected by said selection means; and conversion means having first and second local oscillators for converting said IF signals into signals having respective predetermined frequencies wherein said selection means includes a third local oscillator having a third local oscillation frequency and a fourth local oscillator having a fourth local oscillation frequency, wherein said third local oscillation frequency is different from said fourth local oscillation frequency.

20. The receiving system according to claim 19, wherein a frequency of intermodulation distortion occurring as a result of mutual interference generated by a difference between said third local oscillation frequency and said fourth local oscillation frequency is positioned between channels corresponding to said IF signals.

* * * * *